United States Patent
Parker et al.

(10) Patent No.: US 7,206,826 B1
(45) Date of Patent: Apr. 17, 2007

(54) CONFIGURATION RECOVERY AFTER GATEWAY FAILURE

(75) Inventors: Benjamin J. Parker, Overland Park, KS (US); Shane W. Werner, Olathe, KS (US); Charles Diaz, Overland Park, KS (US); Terry M Frederick, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 878 days.

(21) Appl. No.: 10/054,103

(22) Filed: Oct. 25, 2001

(51) Int. Cl.
*G06F 15/177* (2006.01)
*G06F 15/173* (2006.01)
*G06F 15/16* (2006.01)
*G06F 11/00* (2006.01)

(52) U.S. Cl. .................. 709/220; 709/206; 709/223; 709/227; 714/6; 714/2; 714/15

(58) Field of Classification Search .............. 709/206, 709/223, 227, 228, 220; 214/2, 6, 15
See application file for complete search history.

(56) References Cited

U.S. PATENT DOCUMENTS

| | | | | | |
|---|---|---|---|---|---|
| 5,027,269 | A | * | 6/1991 | Grant et al. ................. | 709/224 |
| 5,341,496 | A | * | 8/1994 | Middledorp et al. ........... | 714/2 |
| 5,652,908 | A | * | 7/1997 | Douglas et al. ................ | 714/4 |
| 6,061,807 | A | * | 5/2000 | Albert et al. .................. | 714/3 |
| 6,253,327 | B1 | * | 6/2001 | Zhang et al. ................ | 713/201 |
| 6,263,369 | B1 | | 7/2001 | Sitaraman et al. | |
| 6,427,170 | B1 | * | 7/2002 | Sitaraman et al. .......... | 709/226 |

* cited by examiner

*Primary Examiner*—Saleh Najjar
*Assistant Examiner*—Kevin T Bates

(57) ABSTRACT

User connection sessions with a gateway in a computer network are preserved even after a temporary failure of the gateway. User status information is stored in a status table in a RADIUS server during times that an authenticated user session is established with the gateway. A failure of the gateway is detected wherein user data stored in the gateway is lost. The gateway sends a request to the RADIUS server to provide the user status information and user data corresponding to each user in the status table. The gateway routes the user traffic to continue the authenticated user session in response to the user data and the user status information without requiring re-authentication following the failure.

7 Claims, 7 Drawing Sheets

CONFIGURATION RECOVERY AFTER GATEWAY FAILURE

BACKGROUND OF THE INVENTION

The present invention relates in general to user authentication in computer networks, and, more specifically, to handling user authentication when there is a temporary failure of a gateway serving the authenticated user.

Computer network service providers operate local or wide area networks to which their customers connect by dial-up, digital subscriber line (DSL) service, or cable modem, for example. The service provider's network includes a hub or gateway that functions as a concentrator or aggregator connected to a plurality of remote users. The gateway routes user traffic to destinations in the local network or to an external network, such as the Internet. The gateway often functions as a service selection gateway (SSG) which allows users to connect to various subscribed, on-demand network services. These subscription services may include a walled garden having various content servers, video on-demand servers, and voice services, or may include a firewall for handling all traffic between the user and the Internet, for example.

To ensure that only paying subscribers gain access to the network, an authentication of the user is performed. Normally, a user ID and password must be supplied by the user in the authentication process. Depending upon configuration of the network, a single entry of the user ID and password can be sufficient to both authenticate the network connection itself and to gain access to individual subscribed services within the network.

Once a user is authenticated, the gateway is configured to interact with the user according to their user profile of subscribed services. The authentication information (e.g., user ID and password) and the subscription information are kept separately from the gateway itself in a centralized authentication, authorization, and accounting (AAA) server. Once a user establishes an authenticated connection session, some of this information is cached on the gateway to facilitate gateway operation without repeated access to the AAA server. Thus, the gateway can operate at a higher throughput and the AAA server (which typically handles many gateways simultaneously and which also has the task of recording the length of time a user is logged-on to any pay for use service) is not overburdened.

Integrity of the authentication and subscription information in the AAA server is very critical for proper network operation. Therefore, the AAA server typically includes backup power systems and redundant hardware to ensure that it provides uninterrupted AAA functions. The gateways, on the other hand, are not as critical and since there are a greater number of gateways than there are AAA servers, there is much less motivation to invest in backup supplies or redundant systems for the gateways. Thus, the gateways are much more likely to experience a failure (such as a power outage).

When a gateway fails and is subsequently restarted, the memory cache of user information stored in the gateway is lost. Since the authentication and user information is no longer available within the gateway when operation of the gateway is re-established, the user is required to re-authenticate by providing their user ID and password. This is undesirable due to the inconvenience to the user. In addition, billing and subscription systems may suffer complications in order to avoid accidentally subscribing a second time to a service during the re-authentication, for example.

SUMMARY OF THE INVENTION

The present invention has the advantage that a user session is recovered following a gateway failure, without requiring the user to re-authenticate.

In one aspect of the present invention, a method is provided for managing user connection sessions with a gateway in a computer network. User data is stored on the gateway in response to authentication by the user. User status information is stored in a table in a RADIUS server during times that an authenticated user session is established with the gateway. The user status information is deleted from the table when the authenticated user session is terminated. The gateway routes the user traffic in response to the user data. A failure of the gateway is detected wherein the stored user data is lost. The gateway sends a request to the RADIUS server to provide the user status information and user data corresponding to each user in the table. The user data is stored on the gateway. The gateway routes the user traffic to continue the authenticated user session in response to the user data and the user status information without requiring re-authentication following the failure.

DETAILED DESCRIPTION OF PREFERRED EMBODIMENTS

Figure 1:
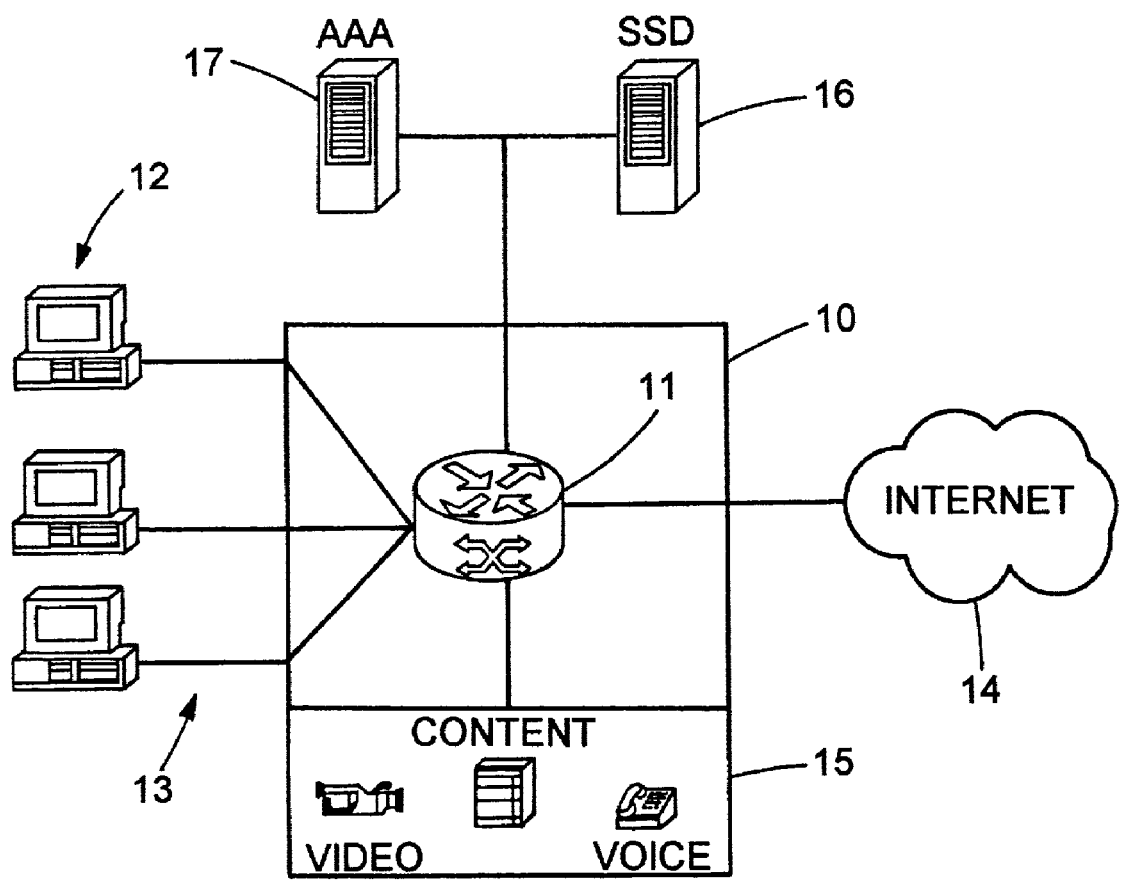
FIG. 1 is a block diagram partially showing a subscription services network architecture for an internet services provider.

Referring to FIG. 1, a known system architecture for a network service provider is partially shown. One example of a commercially available service of this type is the Integrated On-Demand Network (ION) operated by Sprint Communications.

The local network of the service provider includes a number of hubs or gateways, such as gateway 10 in FIG. 1. Each hub includes a concentrator or aggregator 11 which is connected to a plurality of remote users 12 (e.g., residential or business users) via a plurality of connections 13. The connections can be dial-up, digital-subscriber line (DSL), cable modem, fiber optic, wireless, or a combination of these or others. Each remote user communicates point-to-point or bridged with concentrator 11, and concentrator 11 routes the aggregated user traffic to other destinations in the local network or to an external network, such as the Internet 14. Concentrator 11 may for example be comprised of a Cisco 6400 Carrier-Class Broadband Aggregator.

Concentrator 11 either itself or in combination with other hardware components functions as a service selection gateway (SSG) which allows users to subscribe to various on-demand network services. These subscription services may include a walled garden 15 having various content servers, video on-demand servers, and voice services, for example. The service selection gateway works together with a service selection dashboard (SSD) 16 and an authentication, authorization, and accounting (AAA) server 17. SSD 16 functions as an http-based portal for a user to make service selections. Information identifying the selected services (including configuration and billing information) is stored by AAA server 17. When attempted access to subscription services are made by a user, concentrator 11 consults AAA server 17 to determine whether to connect the user with the desired service. AAA server 17 is typically connected to additional concentrators (not shown) interfacing with additional subscribers whose authentication information (e.g., password) and service profile information is also stored in AAA server 17.

Figure 2:
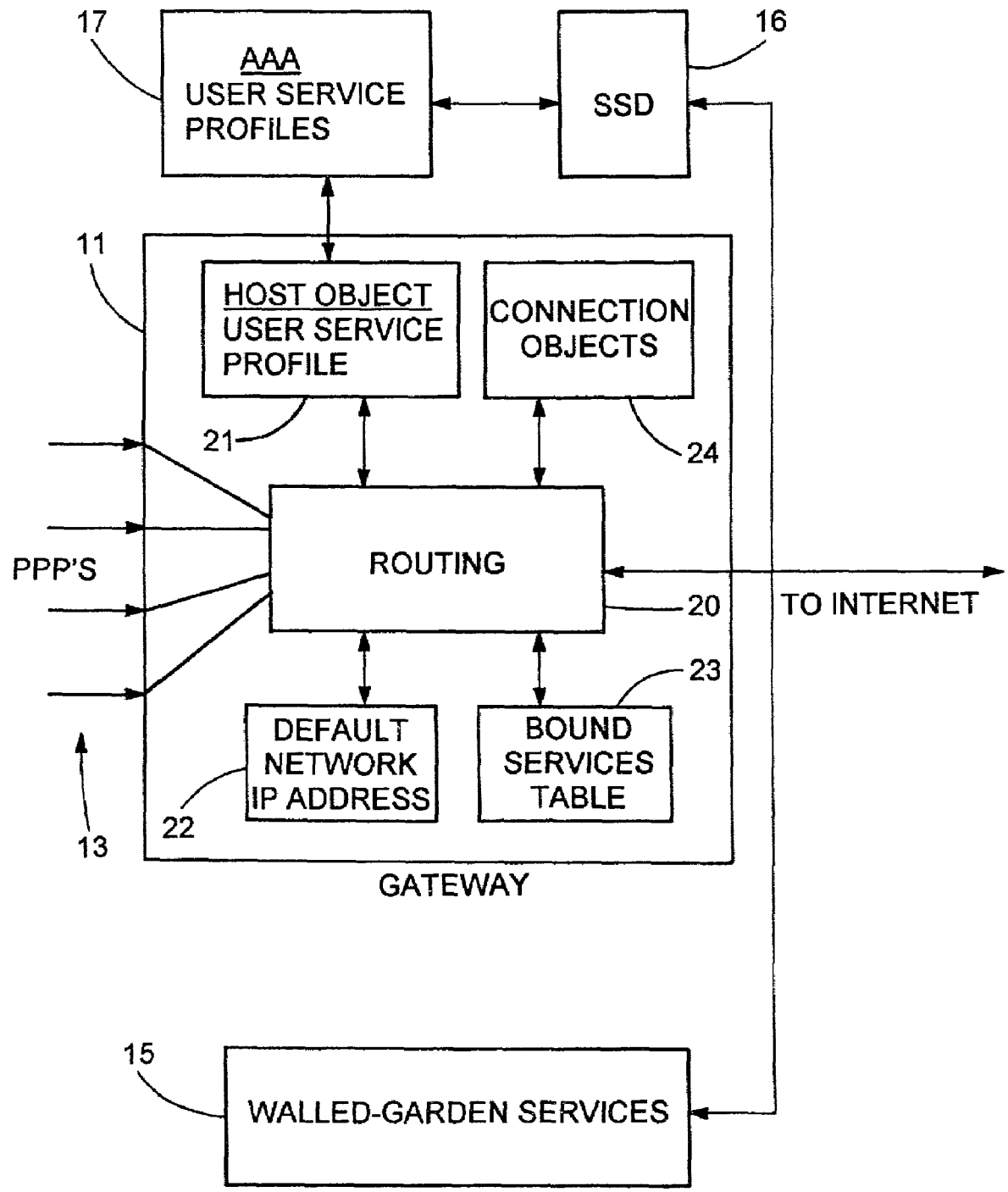
FIG. 2 is a block diagram showing a conventional service selection gateway in greater detail.

The SSG operating within concentrator 11 is shown in greater detail in FIG. 2. A routing block 20 processes all point-to-point (PPP) user traffic received from a user and forwards it on to its next authorized destination. It also demultiplexes and forwards to the user any traffic coming from the network destined for the user.

A memory 21 stores a host object created by the SSG for each user logged-on to the network. The host object includes at least a user service profile retrieved from AAA server 17 after validation of the user ID and password. If a user is logging on for the first time, this will be reflected in the user service profile and the new user is redirected to SSD 20 for making service selections. A memory 22 contains a default network IP address of SSD 20 which routing block 20 uses to perform the redirection of the new user.

After a user has successfully configured their user profile using SSD 16 and the user service profile has been stored in their corresponding host object, the SSG routes subsequent traffic from the user according to that user service profile. A memory 23 contains a bound services table which includes the IP addresses of all the valid resources within the local network, including subscription services such as walled-garden services or firewall services and non-subscription services such as a pass-through router to the Internet. Depending upon which services are shown to be subscribed in the user service profile, routing block 20 uses the bound service IP addresses to perform redirections to those services. When user traffic is first received that is destined for a particular service, and if the SSG determines that the user is authorized to use the service, then the SSG creates a connection object which is stored in a memory 24. The connection object provides a channel between the user and the service during the connection session (i.e., until the user signs off of the service or until a time-out of a period of inactivity, if any).

Memories 21 and 24 are contained within the short-term random access memory (RAM) of the SSG, and are retained only for as long as the SSG is supplied with electrical power and its operating system continues to function.

Figure 3:
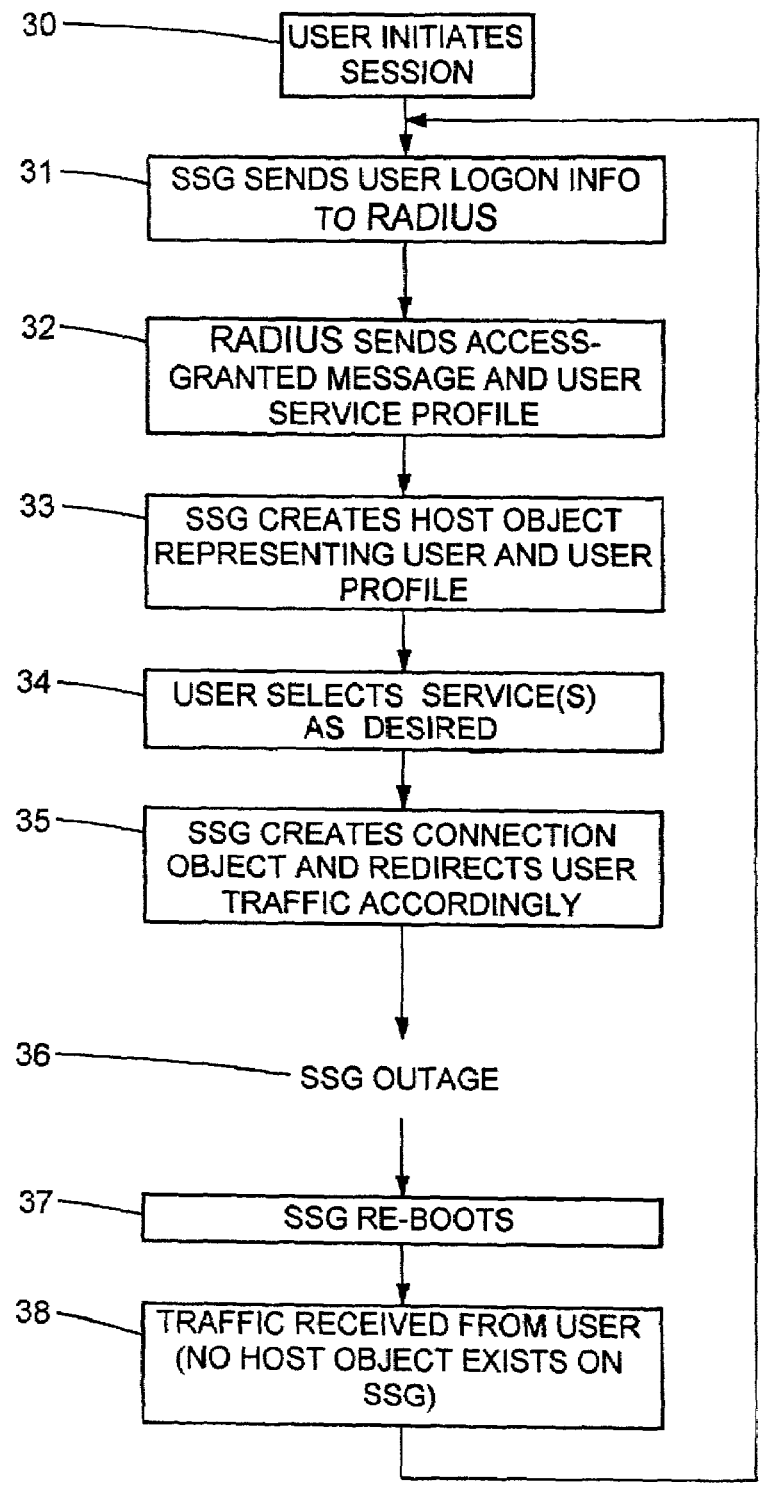
FIG. 3 is a flowchart showing a prior authentication method and the actions resulting from a gateway failure.

FIG. 3 shows a sequence of events in the authentication process of the prior art. In step 30, a user initiates a network session by launching a PPP application and providing a network user ID and password, for example. In step 31, the SSG establishes a PPP connection with the user and forwards an "access request" message including the received logon information to a remote authentication dial-in user service (RADIUS) server contained within the AAA server. If the user logon information is valid, the RADIUS responds in step 32 with an "access granted" message which includes information about the user service profile (i.e., those services which the user has currently subscribed to).

In step 33, the SSG creates a host object representing the accepted user. The host object preferably includes an IP address assigned (either statically or dynamically) to the user and a list of authorized services and configuration data. Access to the network having been granted, the user is able to select from the available services in step 34 (e.g., browsing to files or web pages on the Internet or interacting with walled garden services). In step 35, the SSG creates a connection object for routing user traffic between the user and the selected service.

During a user session with an active connection object, an SSG outage or failure 36 may occur. The outage may be caused by a power failure or a lock-up or crash of the SSG, for example.

After the outage is resolved, the SSG is re-booted in step 37. In the case of a power failure, the SSG may automatically re-boot when power is restored. When the outage resulted from a lock-up, the re-booting of step 37 can be initiated manually by a network operator, for example. As a result of the power loss and/or re-booting of the SSG, the RAM contents including the host object and any connection objects are lost. In step 38, when the next user traffic is received after re-booting of the SSG, no host object is recognized for the user. The user is deemed to be unauthenticated and the method returns to step 31. Typically, the SSG would need to prompt the user for a user ID and password for the authentication. The required re-authentication is undesirable from a user standpoint. SSG outages can sometimes be very short in duration (a few minutes or less), making it especially confusing to a user as to why re-authentication is necessary.

Figure 4:
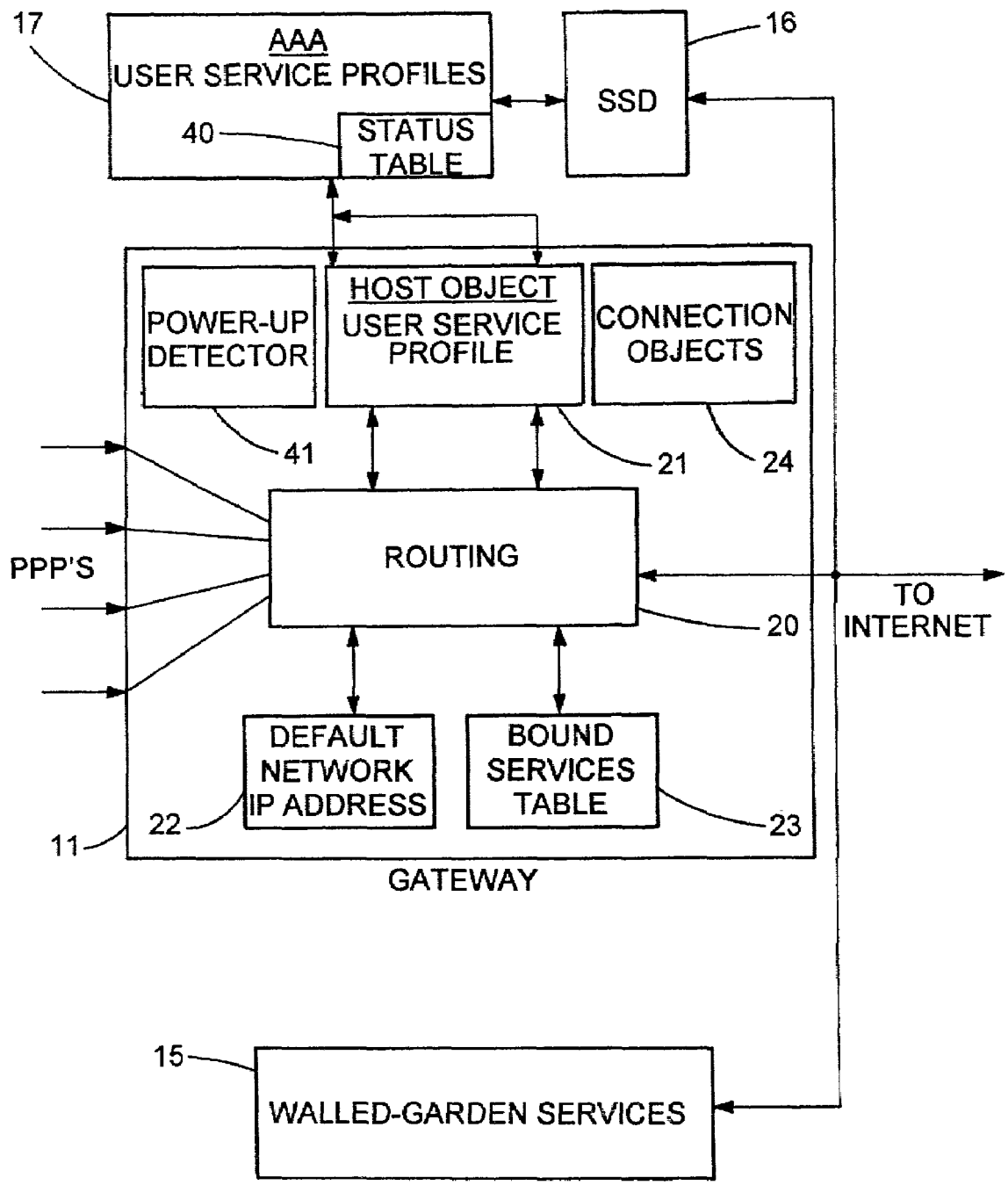
FIG. 4 is a block diagram showing a preferred embodiment of a service selection gateway and an AAA server of the present invention.

The present invention overcomes the problems of the prior art by introducing the improvements shown in FIG. 4. Specifically, a status table 40 is maintained within AAA server 17. Programming is included in AAA server 17 and the SSG such that for each user in an active session, table 40 includes entries storing user status information. Preferably, the user status information includes at least an identification of the active user (e.g., user ID and/or IP address) and a list of services that are currently being accessed by the user (i.e., for which there is a connection object). When the user connects or disconnects to services, the corresponding entry in status table 40 is updated accordingly. Since status table 40 is remote from the SSG in concentrator 11, it is not lost when an SSG outage occurs.

When a failure is detected as the SSG is recovering from an outage, the SSG repopulates its memory based on the contents of table 40. For example, a boot sequence of the SSG is modified so that it queries AAA server 17 for the contents of status table 40 and it reconstructs the host objects and connection objects that existed in its memory prior to the outage. In the context of the present invention, detection of a failure includes the attempted reconstruction of host objects and connection objects from status table 40 during every boot-up of the SSG. In that instance, the transition from power failure to power on is detected by a power-up detector 41, which is preferably provided by the conventional power-on reset circuit. Failure detection in the present invention also includes manual or automatic detection of other failure conditions such as system crash or lock-up. In those instances, a manual re-boot can be initiated. Alternatively, the SSG can be programmed to perform special routines on command (i.e., separate from the boot-up process) to reconstruct host objects and connection objects.

Figure 5:
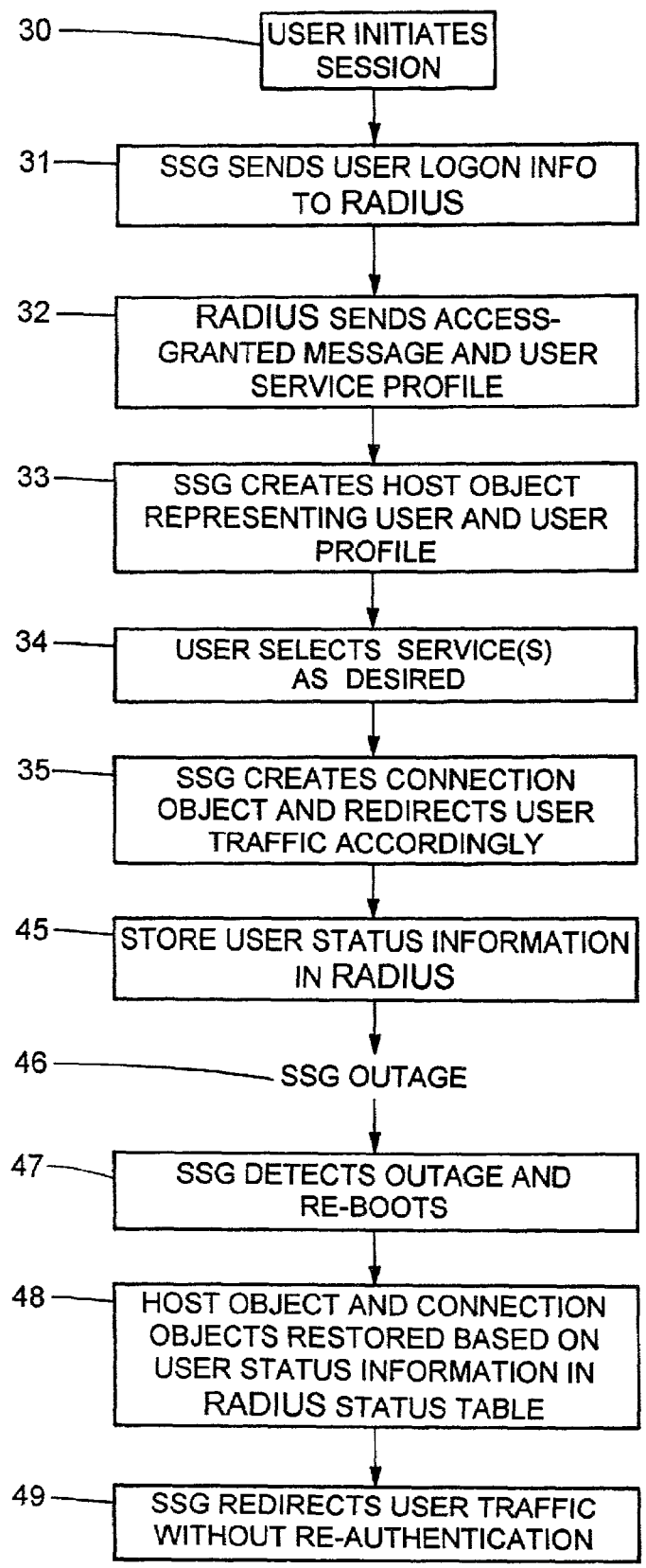
FIG. 5 is a flowchart of a preferred overall method of the invention and the actions resulting from a gateway failure.

Overall performance of the present invention is shown in FIG. 5. Steps 30–35 occur in a manner similar to that already described for FIG. 3. Once a connection object is created in step 35, user status information is stored and/or updated in the status table in step 45 by communicating this information between the SSG and the AAA server using the RADIUS protocol, for example. The user status information may include user identifying information (such as IP address) and service status information. To reduce accesses to the AAA server, a transfer to the status table can be delayed until the first connection object is created. Alternatively, a status table entry can be created with just the user identifying information by the AAA server concurrently with sending its access-granted message. The table entry is later updated with additional identifying information (e.g., IP address) and service identification once a service is accessed by the user.

After an SSG outage 46, the status table still exists and can be used by the SSG to repopulate the user specific objects and to continue the ongoing session of the user without interruption for a re-authentication. The SSG detects that an outage occurred and a boot sequence of the SSG/concentrator is initiated in step 47. In step 48, host objects and connection objects that were present in the SSG at the onset of the failure are restored based on the user status information retrieved from the AAA/RADIUS status table. In step 49, the SSG resumes the redirection of user traffic according to the reconstructed connection objects without any need for re-authentication.

Figure 6:
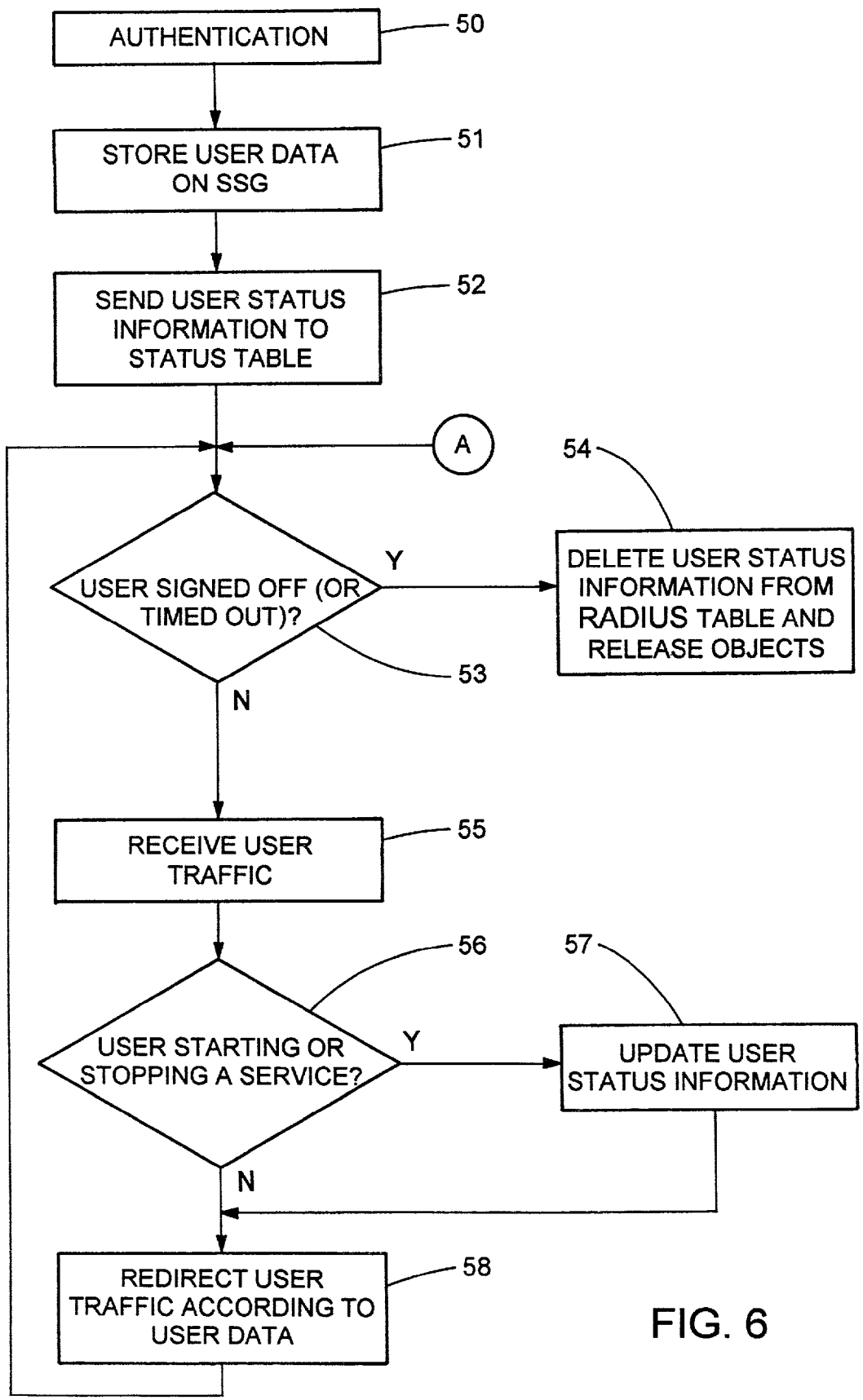
FIG. 6 is a flowchart showing a preferred method of storing user data and user status information during normal network operation.

Activity specific to the SSG is shown in greater detail in FIG. 6. After authentication in step 50, the SSG stores User Data in its memory in step 51. The User Data comprises an IP address assigned to the user/subscriber and a user service profile received from the AAA server, for example. In step 52, the SSG sends User Status Information to the status table in the AAA/RADIUS server.

An SSG operating loop begins at a step 53 wherein a check is made to determine whether the user has signed off or been inactive for greater than a predetermined period of time (i.e., timed-out). If yes, then the SSG releases or deletes the host object and connection objects corresponding to the user and sends a message to the AAA/RADIUS server to delete the corresponding User Status Information from the status table in step 54; otherwise, user traffic is received in step 55.

In step 56, the SSG determines whether the user is starting or stopping a service. If a service is being started or stopped, the SSG creates or deletes a corresponding connection object and sends an update for the User Status Information to the AAA/RADIUS server in step 57. The user traffic is redirected in step 58 according to the User Data and the corresponding connection object, and then the loop returns to step 53.

Figure 7:
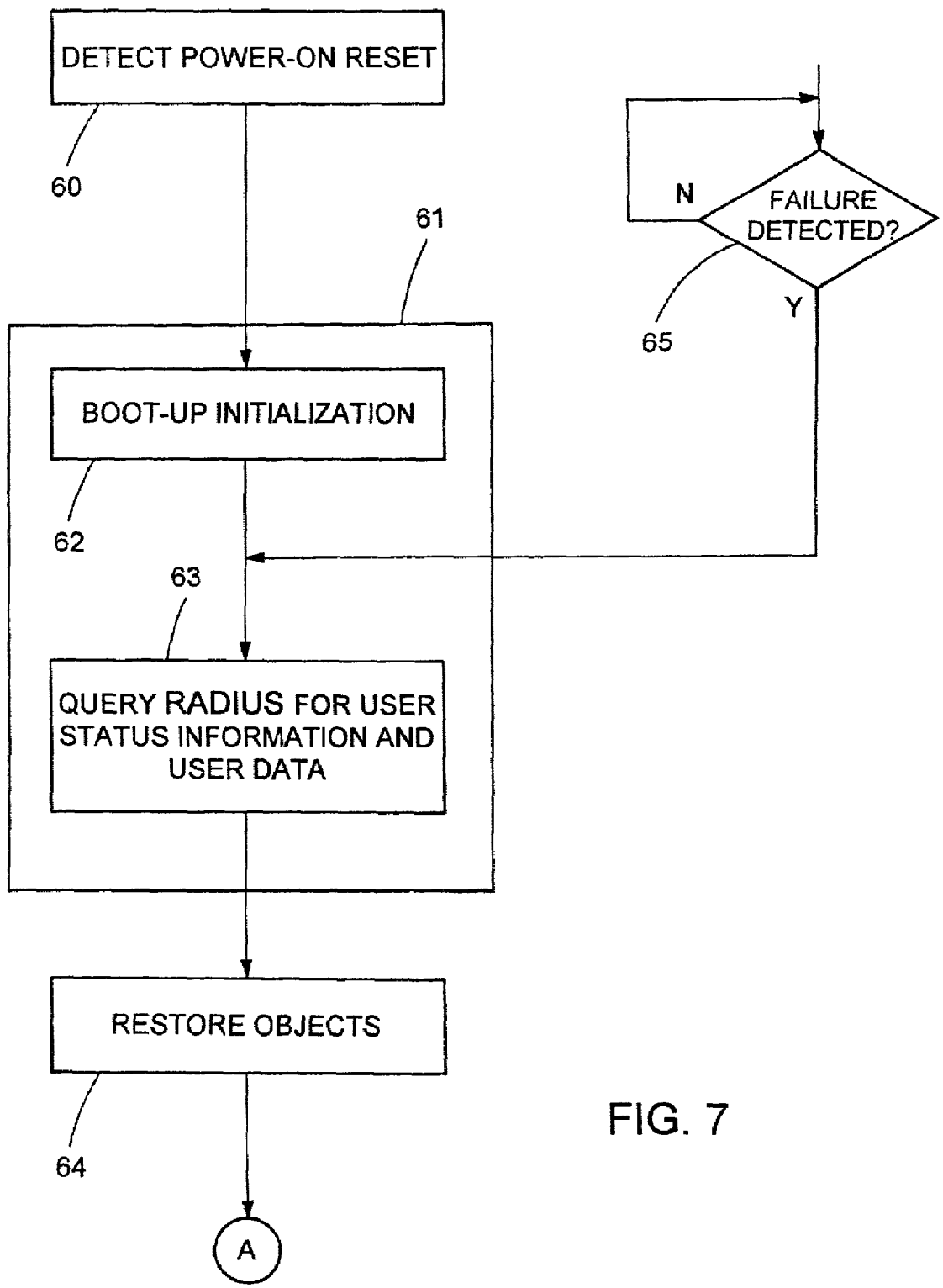
FIG. 7 is a flowchart showing a preferred method of detecting and recovering from a gateway failure.

FIG. 7 shows a detection of and recovery from a failure of the SSG. In step 60, the SSG/concentrator detects a power-on reset for initiating a start-up sequence 61. Sequence 61 includes a boot-up initialization 62 followed by a AAA/RADIUS query 63. In step 63, the SSG sends a request message to the AAA/RADIUS server for the User Status Information from the status table together with User Data of each user having an entry in the status table. Using this information, the SSG restores the host objects and connection objects in step 64 that were present at the time that the SSG failure occurred. After restoration, the method returns to point A in FIG. 6.

FIG. 7 shows the possibility of providing failure detection other than that inherent in the re-booting of the SSG/concentrator. Thus, in step 65, an SSG failure detector such as a watchdog or other software or hardware monitor checks to determine whether the SSG continues to operate properly. If no failure is detected, then periodic checks continue by continuously looping through step 65. When a failure is detected, a jump is made to start-up sequence 61. Depending upon the type of failure and the status of the SSG, the jump may be to step 63 as shown or to step 62 so that the entire start-up sequence is performed.

What is claimed is:

1. A method of managing user connection sessions with a gateway in a computer network, said method comprising the steps of:

storing user data on said gateway in response to authentication by said user;

storing user status information in a table in a RADIUS server during times that an authenticated user session is established with said gateway, said RADIUS server being on a physically separate machine than said gateway and being connected to said gateway via said computer network;

deleting said user status information from said table when said authenticated user session is terminated;

said gateway routing said user traffic in response to said user data;

detecting a failure of said gateway wherein said stored user data is lost;

said gateway sending a request to said RADIUS server to provide said user status information and user data corresponding to each user in said table;

storing said user data on said gateway; and said gateway routing said user traffic to continue said authenticated user session in response to said user data and said user status information without requiring re-authentication following said failure.

2. The method of claim 1 wherein said user status information includes an IP address assigned to said user for said session.

3. The method of claim 1 wherein said detecting step is comprised of a power-up initialization.

4. The method of claim 1 wherein said step of requesting said RADIUS server to provide said user status information and said user data is included in a boot-up sequence of said gateway.

5. The method of claim 1 wherein said user data comprises a host object and a connection object.

6. The method of claim 5 wherein said step of storing user status information in said table is delayed until a connection object is created for said user.

7. The method of claim 1 wherein said gateway is comprised of a service selection gateway.

* * * * *